United States Patent
Uchida

(10) Patent No.: US 10,416,613 B2
(45) Date of Patent: Sep. 17, 2019

(54) MACHINING TIME ESTIMATING APPARATUS

(71) Applicant: FANUC CORPORATION, Yamanashi (JP)

(72) Inventor: Satoshi Uchida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/429,325

(22) Filed: Feb. 10, 2017

(65) Prior Publication Data
US 2017/0242408 A1 Aug. 24, 2017

(30) Foreign Application Priority Data
Feb. 18, 2016 (JP) .................. 2016-029281

(51) Int. Cl.
G05B 6/02 (2006.01)
G05B 19/4093 (2006.01)

(52) U.S. Cl.
CPC ......... *G05B 6/02* (2013.01); *G05B 19/40938* (2013.01); *G05B 2219/36219* (2013.01); *Y02P 90/265* (2015.11)

(58) Field of Classification Search
USPC .............................................. 700/19; 307/35
See application file for complete search history.

(56) References Cited

U.S. PATENT DOCUMENTS 5,514,941 A 5/1996 Kita
5,757,648 A * 5/1998 Nakamura ............. B23Q 41/06
700/100

(Continued)

FOREIGN PATENT DOCUMENTS

CN 104966138 A 10/2015
CN 105302544 A 2/2016

(Continued)

OTHER PUBLICATIONS

Liu et al., "A feature-Based NC Machining Time Forecasting Model" IEEE Proceedings of the 2011 15th International conference on Computer Supported Cooperative Work in Design, pp. 593-598 (Year: 2011).*

(Continued)

*Primary Examiner* — Emilio J Saavedra
(74) *Attorney, Agent, or Firm* — Hauptman Ham, LLP

(57) ABSTRACT

A machining time estimating apparatus is stored with mechanical configuration-time data, which are control parameters relating to respective machining times of a plurality of numerically-controlled machine tools, and is provided with a machining time estimation unit, configured to estimate the machining time required for machining performed based on an NC command in a first one of the plurality of numerically-controlled machine tools, and a mechanical configuration difference time calculation unit configured to calculate machining times required for machining performed based on the NC command in the other ones of the plurality of numerically-controlled machine tools than the first numerically-controlled machine tool, based on the respective mechanical configuration-time data of the plurality of numerically-controlled machine tools.

3 Claims, 4 Drawing Sheets

(56) References Cited

U.S. PATENT DOCUMENTS

| | | | |
|---|---|---|---|
| 7,167,772 B2 * | 1/2007 | Hioki | G05B 19/4103 318/568.1 |
| 2003/0110006 A1 | 6/2003 | Nakamura | |
| 2005/0228533 A1 | 10/2005 | Hioki et al. | |
| 2012/0109359 A1 | 5/2012 | Mizuno et al. | |
| 2015/0241867 A1 | 8/2015 | Kanemaru et al. | |
| 2016/0026167 A1 | 1/2016 | Yamada et al. | |

FOREIGN PATENT DOCUMENTS

| | | |
|---|---|---|
| DE | 102015001887 A1 | 8/2015 |
| JP | H6-138924 A | 5/1994 |
| JP | 2002-73126 A | 3/2002 |
| JP | 2003-175439 A | 6/2003 |
| JP | 2004-58190 A | 2/2004 |
| JP | 2005301440 A | 10/2005 |
| JP | 2007025945 A | 2/2007 |
| JP | 2012-93975 A | 5/2012 |
| KR | 10-2008-0079849 A | 9/2008 |

OTHER PUBLICATIONS

Decision to Grant a Patent in JP Patent Application No. 2016-029281, dated Feb. 20, 2018, 6 pp.
Office Action in CN Application No. 201710086235.0, dated Aug. 24, 2018, 15pp.
Office Action in DE Application No. 102017102768.8, dated Mar. 12, 2019, 8pp.

* cited by examiner

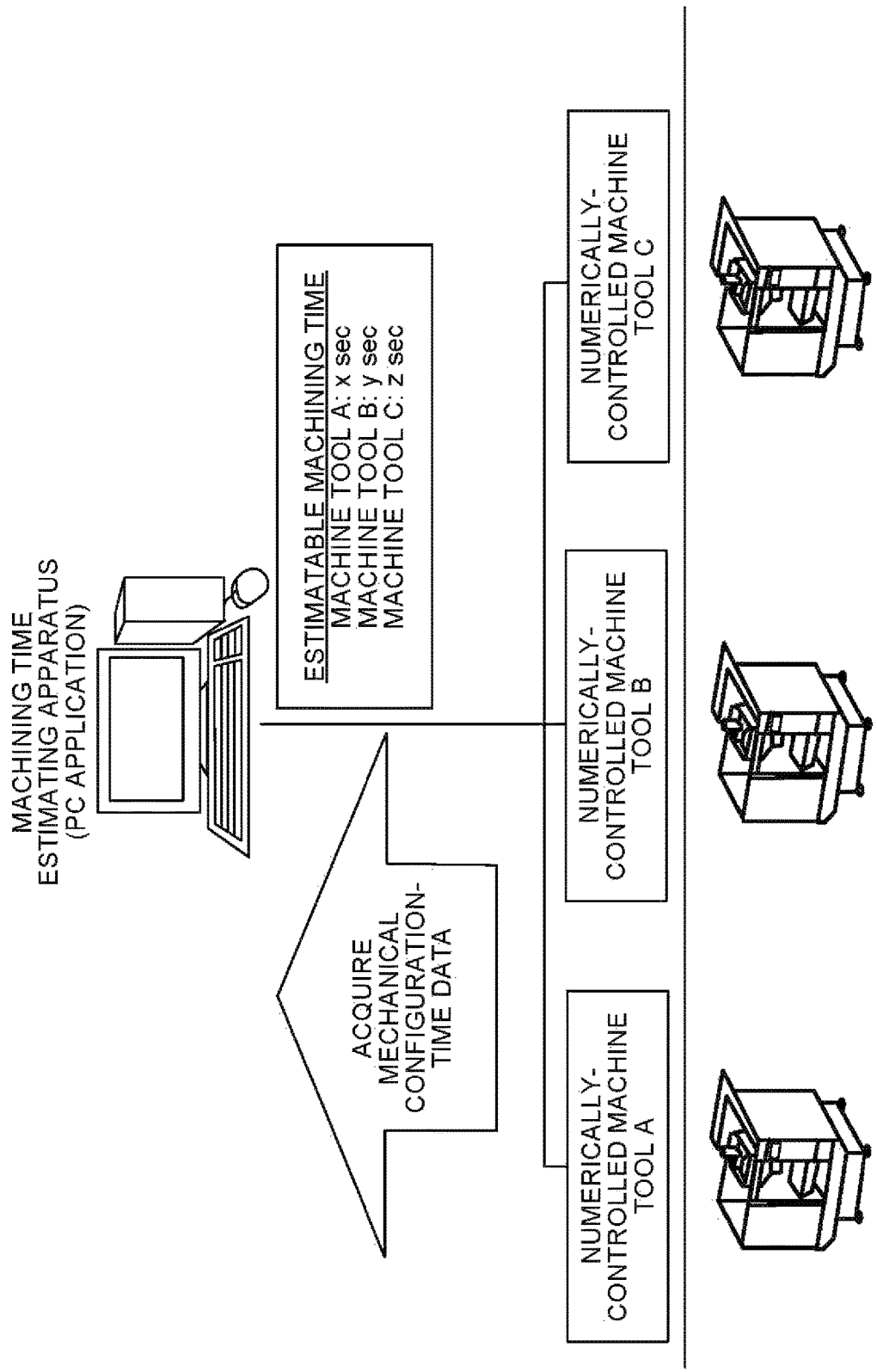

MACHINING TIME ESTIMATING APPARATUS

RELATED APPLICATIONS

The present application claims priority to Japanese Patent Application Number 2016-029281, filed Feb. 18, 2016, the disclosure of which is hereby incorporated by reference herein in its entirety.

BACKGROUND OF THE INVENTION

Field of the Invention

The present invention relates to a machining time estimating apparatus, and more particularly, to a machining time estimating apparatus configured to estimate a machining time by means of a plurality of numerically-controlled machine tools.

Description of the Related Art

In order to efficiently operate a numerically-controlled machine tool, it is important to estimate the time of machining by the machine tool in advance. The machining time as used herein is the time required for machining by moving a tool in the numerically-controlled machine tool. Machining time reduction for a machining program for the purpose of optimization of the machining by the numerically-controlled machine tool and cost reduction is the subject in the field of machining.

There is a machining time estimating apparatus having the function of estimating the machining time for a created machining program in order to efficiently perform the operation for reducing the machining time. In the machining time estimating apparatus, the machining time can be obtained by calculation without performing actual machining. The machining time changes depending on the mechanical configuration (times required for setting parameters such as time constants and for M, S, T and B auxiliary functions) of a numerically-controlled machine tool. Estimation in consideration of the mechanical configuration can also be achieved by conventional machining time estimating apparatuses (e.g., Japanese Patent Applications Laid-Open Nos. 2012-093975, 2005-301440, and 2007-025945).

Although the estimation can be performed in consideration of the mechanical configuration of the numerically-controlled machine tool as described above, the mechanical configuration to be estimated is that of only a single numerically-controlled machine tool. If the mechanical configuration varies, therefore, the machining time estimation must be performed on each occasion, so that machining times estimatable on a plurality of different mechanical configurations cannot easily be compared.

SUMMARY OF THE INVENTION

Accordingly, the object of the present invention is to provide a machining time estimating apparatus based on a numerically-controlled machine tool, capable of collectively estimating machining times and easily comparing the estimated machining times, thereby improving the efficiency of machining time reduction operation.

A machining time estimating apparatus of one embodiment of the present invention is configured to collectively calculate machining times required for machining performed in a plurality of numerically-controlled machine tools based on an NC command and comprises a mechanical configuration-time data storage unit configured to store mechanical configuration-time data, which are control parameters relating to respective machining times of the plurality of numerically-controlled machine tools, a machining time estimation unit configured to estimate the machining time required for the machining performed based on the NC command in a first one of the plurality of numerically-controlled machine tools stored in the mechanical configuration-time data storage unit, based on the NC command and the mechanical configuration-time data of the first numerically-controlled machine tool, an NC command data counting unit configured to count those ones of NC command data decoded from the NC command which affect the machining time by means of a mechanical configuration, and a mechanical configuration difference time calculation unit configured to calculate machining times required for machining performed based on the NC command in the other ones of the plurality of numerically-controlled machine tools than the first numerically-controlled machine tool, based on the mechanical configuration-time data stored in the mechanical configuration-time data storage unit, the machining time estimated by the machining time estimation unit, and the NC command data affecting the machining time by means of the mechanical configuration, which are counted by the NC command data counting unit.

According to the present invention, there can be provided a method and an apparatus for estimating machining times based on a numerically-controlled machine tool, capable of collectively estimating machining times and easily comparing the estimated machining times, on a plurality of mechanical configurations, thereby improving the efficiency of machining time reduction operation.

BRIEF DESCRIPTION OF THE DRAWINGS

The above and other objects and features of the present invention will be obvious from the ensuing description of embodiments with reference to the accompanying drawings, in which:

FIG. 4 is a diagram showing a general outline of machining time estimation for a plurality of numerically-controlled machine tools by the machining time estimating apparatus of FIG. 2.

DETAILED DESCRIPTION OF THE PREFERRED EMBODIMENTS

An embodiment of the present invention will now be described with reference to the accompanying drawings.

In estimating machining times of machining based on the respective machining programs of a plurality of numerically-controlled machine tools, a machining time estimating apparatus of the present invention estimates the machining times for the other machine tools based on a machining time estimated for one of the numerically-controlled machine tools. In doing this, the machining time estimating apparatus takes advantage of the fact that the machining time as a time for machining performed based on a machining program comprises a fixed machining time that is not changeable depending on the mechanical configuration of the numerically-controlled machine tool and a configuration-dependent machining time that changes depending on the mechanical configuration of the numerically-controlled machine tool. The machining time estimating apparatus of the present invention counts and holds values (distances, frequencies, etc.) of data on portions that affect the machining time by means of the mechanical configuration of each numerically-controlled machine tool for an NC command contained in the machining program. Based on the held values and various values (mechanical configuration-time data described later) settled by the mechanical configuration of each numerically-controlled machine tool, the machining time estimating apparatus calculates the configuration-dependent machining time for each numerically-controlled machine tool and uses the calculated configuration-dependent machining time to estimate the machining times for the other machine tools based on the machining time estimated for the one numerically-controlled machine tool.

Figure 1:
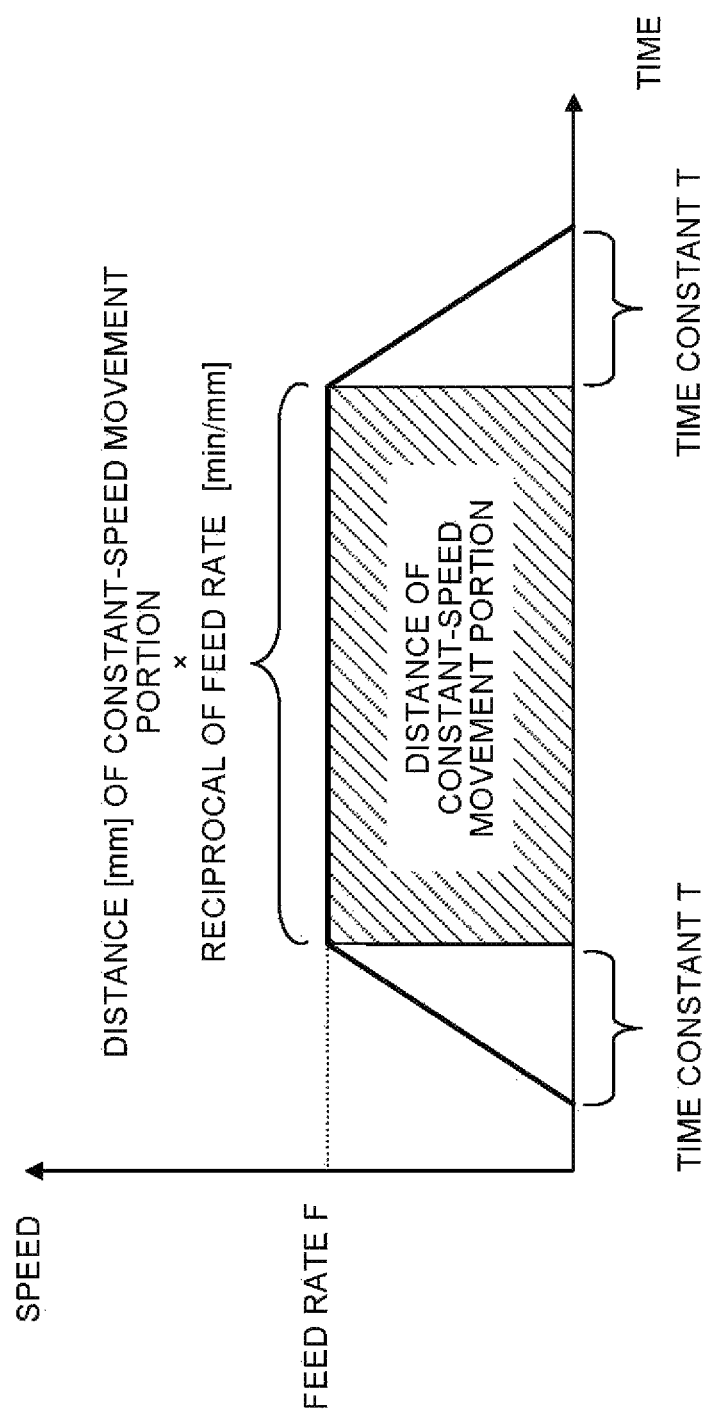
FIG. 1 is a diagram illustrating a method for calculating estimated machining times according to the present invention.

The above-described machining times that change depending on the mechanical configuration of the numerically-controlled machine tool include acceleration/deceleration times at the start and end points of a feed command, a time for the feed command for the case in which a feed rate set in the numerically-controlled machine tool is used, and times for M, S, T and B auxiliary functions, and the like. In moving an axis based on the feed command in the numerically-controlled machine tool, for example, the moving speed of the axis concerned is controlled in the manner illustrated in FIG. 1. A time constant T used as a time for acceleration and deceleration in FIG. 1 is set as a parameter of the numerically-controlled machine tool. If a feed rate F for the feed command is not designated in the machining program, the feed rate set as a parameter of the numerically-controlled machine tool is also used as the feed rate F.

Thus, the numerically-controlled machine tool of the present invention can count and hold acceleration and deceleration frequencies of the axis designated in the machining program (each substantially equal to the frequency of execution of the feed command), distance of a constant-speed movement portion of the feed command (with no feed rate commanded in the machining program), and the like and calculate the configuration-dependent machining time for acceleration and deceleration at the time of execution of the NC program, the configuration-dependent machining time for the constant-speed movement portion at the time of execution of the machining program, and the like, based on the held values and the parameter values of each numerically-controlled machine tool. The numerically-controlled machine tool is configured to also calculate other configuration-dependent machining times based on the values of the data on the portions that affect the machining time counted based on the NC command contained in the machining program and the values settled by the mechanical configuration of the numerically-controlled machine tool.

Figure 2:
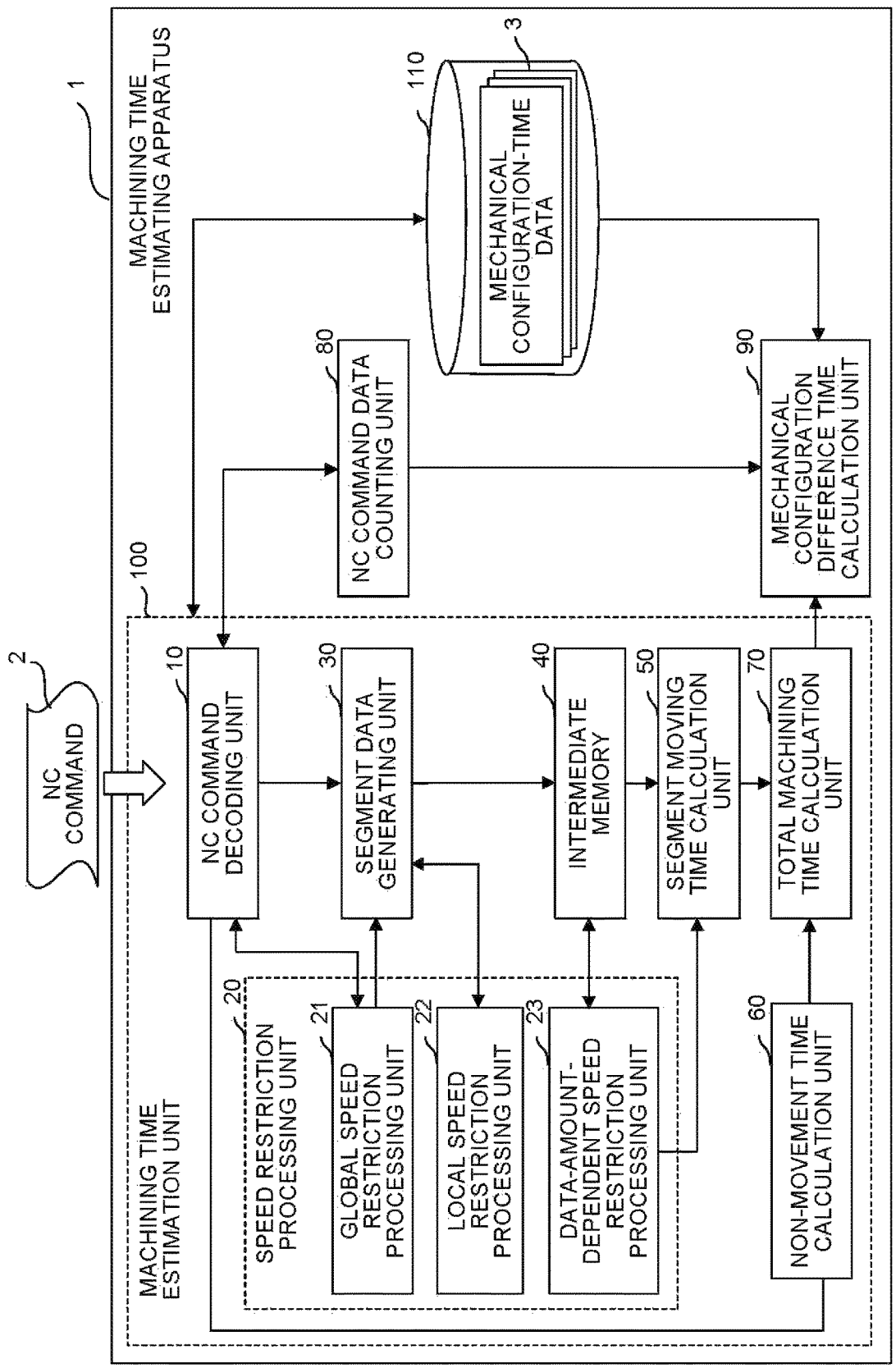
FIG. 2 is a functional block diagram of a machining time estimating apparatus according to one embodiment of the present invention.

FIG. 2 is a block diagram illustrating a machining time estimating apparatus 1 according to one embodiment of the present invention.

The machining time estimating apparatus 1 comprises a machining time estimation unit 100, which includes an NC command decoding unit 10, speed restriction processing unit 20, segment data generating unit 30, intermediate memory (buffer) 40, segment moving time calculation unit 50, non-movement time calculation unit 60, and total machining time calculation unit 70, and in addition, an NC command data counting unit 80, a mechanical configuration difference time calculation unit 90, and a mechanical configuration-time data storage unit 110.

The individual functional means included in the machining time estimation unit 100 have the same functions as the ones disclosed in Japanese Patent Application Laid-Open No. 2012-093975.

The NC command decoding unit 10 receives an NC command (machining program) 2 as an input, decodes its content, and divides it into command data for each block described in the NC command (machining program) 2, thereby generating block data. The input NC command 2 is identical to that input to a CNC (numerical controller) and may be data of any form, such as a text file, binary data stored in a program memory of the CNC, or the like.

The block data represents the command content of each block that constitutes the original NC command (machining program) 2 and contains information on the positions of the block start and end points, the type of a path from the start point to the end point (e.g., straight line or circular arc) and information (e.g., center position of a circular arc) that determines the path, and tool speed information for tool movement.

The speed restriction processing unit 20 comprises a global speed restriction processing unit 21, local speed restriction processing unit 22, and data-amount-dependent speed restriction processing unit 23.

The global speed restriction processing unit 21 compares a command speed Vc commanded in the NC command (machining program) 2 and a speed Via predetermined according to the curvature of a tool path and defines the smaller one of these values as an upper-limit speed Vlim. Data on the command speed Vc and the tool path curvature are based on the block data generated in the NC command decoding unit 10. Data on the speed Via predetermined according to the tool path curvature is stored in advance in a memory (not shown). In calculating the moving time of the tool under speed override, a speed obtained by multiplying the command speed Vc by the ratio of override is used in place of the command speed Vc. Since the local speed restriction processing unit 22 and the data-amount-dependent speed restriction processing unit 23 use segment data, they will be described later.

The segment data generating unit 30 receives the block data generated in the NC command decoding unit 10 and divides the tool path from the start point to the end point of each block into segments. In this method of division, a division speed Vd is determined by multiplying the command speed Vc by a predetermined coefficient k or a coefficient determined based on the tool path curvature, and the segments are sequentially cut out from the block start point with a distance Vd·τ, which is obtained by multiplying the division speed Vd by a predetermined time τ, regarded as a division interval. The individual segments thus generated are minute sections of the tool path. If the length of each segment is L, it can be expressed as L=Vd·τ. The predetermined time τ is assumed to be equal to or longer than an interpolation cycle.

The cut-out minute sections are accumulated (or stored) as the segment data in the intermediate memory (buffer) 40. The segment data stored in the intermediate memory 40 include the segment length L, a segment direction (vector from the start point to the end point), the upper-limit speed, and a corner speed Vr obtained in the local speed restriction processing unit 22.

The local speed restriction processing unit 22 obtains the maximum one of such speeds that the speed difference between each two adjacent segments, acceleration difference, and jerk are within their respective tolerances for the segment generated by the segment data generating unit 30, and uses the obtained speed as the corner speed Vr at the junction between the adjacent segments. The tool path curvature may be taken into account by the local speed restriction processing unit 22 in place of the global speed restriction processing unit 21. The segment data with the values set in this manner are accumulated (or stored) in the intermediate memory (buffer) 40.

The data-amount-dependent speed restriction processing unit 23 is a means for improving the accuracy of the calculated machining time by adopting a restriction on the tool moving speed that is determined depending on the number of segment data. This is a processing unit that is provided for the machining time estimating apparatus to reproduce how the restriction on the speed is determined by the number of data read by, for example, a look-ahead processing unit for prefetching the NC command.

The data-amount-dependent speed restriction processing unit 23 forms a speed curve U(t) called a deceleration curve, which represents a speed change, toward the leading segment of the intermediate memory (buffer) 40, on the assumption that a predetermined speed Ua is reached at the end point of the trailing segment (segment generated last) accumulated in the intermediate memory 40. Since the tool cannot move at a speed above the speed curve U(t), this value U(t) is called an allowable speed. Although the predetermined speed Ua is normally 0, it may alternatively be a finite value.

The segment moving time calculation unit 50 sequentially takes out the segment data from the head of the intermediate memory (buffer) 40 and calculates the time required for the movement of the segments.

The non-movement time calculation unit 60 calculates a stop time responsive to a tool stop command and non-movement times, which are execution times for other instructions than a move command, such as M, S, and T commands, based on the block data of the NC command 2 decoded by the NC command decoding unit 10.

Moreover, the total machining time calculation unit 70 calculates a total machining time, which is the sum of the time required for the movement of the segments calculated by the segment moving time calculation unit 50 and the non-movement times calculated by the non-movement time calculation unit 60.

The individual functional means included in the machining time estimation unit 100 described hereinabove can estimate the machining time required for machining in one numerically-controlled machine tool based on the NC command 2 by using mechanical configuration-time data 3 stored in the mechanical configuration-time data storage unit 110 (described later). Since the above-described functional means are already known from Japanese Patent Application Laid-Open No. 2012-093975 and the like, a further detailed description thereof will be omitted herein.

Figure 3:
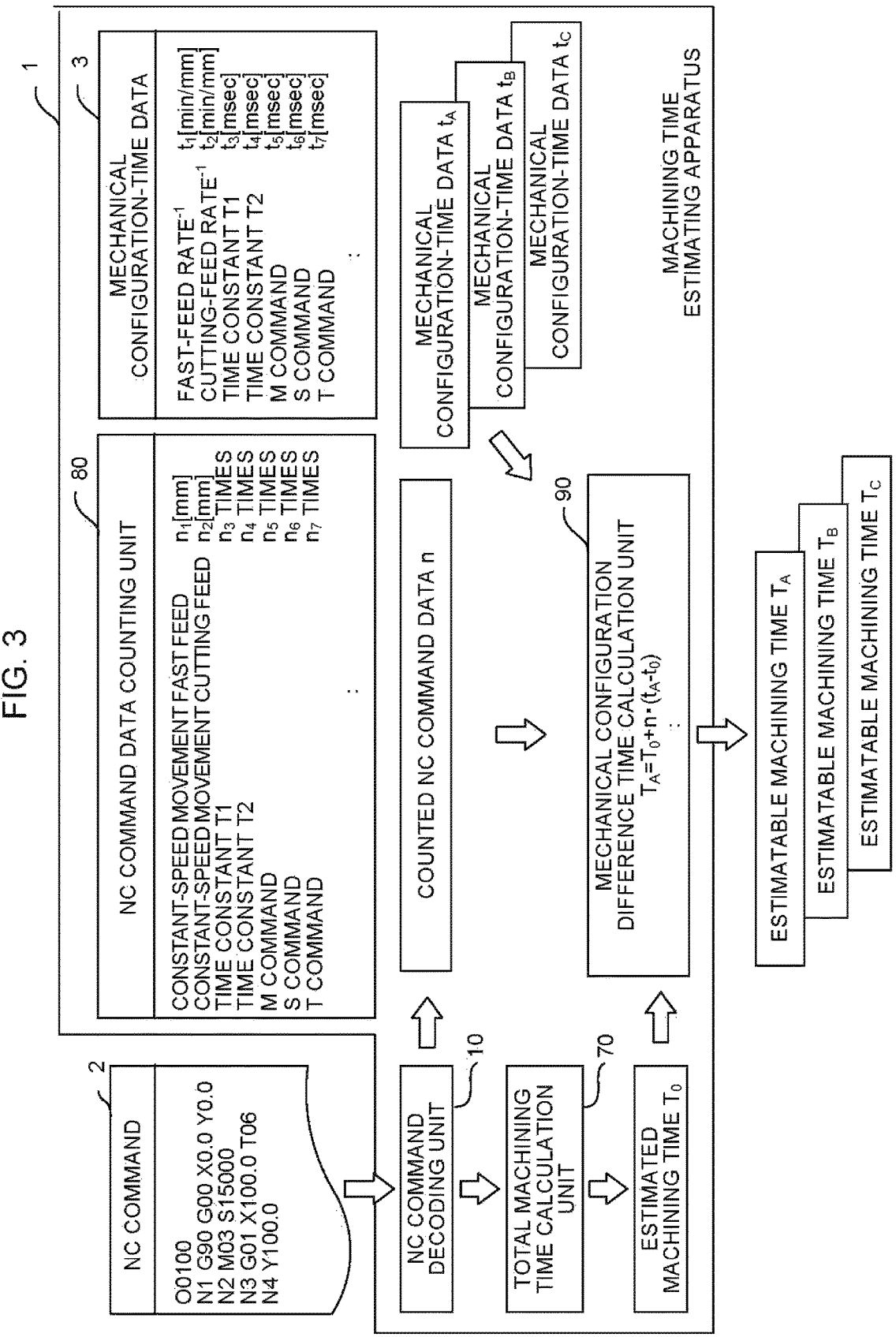
FIG. 3 is a diagram showing an example of machining time estimation by the machining time estimating apparatus of FIG. 2.

The NC command data counting unit 80 counts and holds the values (distances, frequencies, etc.) of those ones of the NC command data decoded by the NC command decoding unit 10 based on the NC command 2 which affect the machining time by means of the mechanical configuration. By way of example, as shown in FIG. 3, the NC command data counting unit 80 counts the total distance of the constant-speed movement portions of a fast-feed command (G00) and a cutting-feed command (G01) with no feed rate designated in the NC command 2, frequencies of application of time constants (frequencies of acceleration and deceleration control of axes based on the individual time constants), and command frequency of each auxiliary function, and the like. These values can be identified with reference to the NC command data, which is a result of decoding of the NC command 2 by the NC command decoding unit 10. In the description to follow, counted NC command data n can be expressed by equation (1) as follows:

$$n = \begin{pmatrix} n_1 \\ n_2 \\ \vdots \end{pmatrix} \quad (1)$$

The mechanical configuration-time data 3 stored in the mechanical configuration-time data storage unit 110 is composed of "control parameters of numerically-controlled machine tools relating to machining times". A plurality of mechanical configuration-time data 3 are prepared depending on the number of different mechanical configurations. In the example shown in FIG. 3, respective mechanical configuration-time data $t_A$, $t_B$ and $t_C$ of numerically-controlled machine tools A, B and C are prepared. Each of the mechanical configuration-time data $t_A$, $t_B$ and $t_C$ is composed of "parameters relating to the machining time set in the numerically-controlled machine tool (e.g., the reciprocal of a default fast-feed command, reciprocal of a default cutting-feed command, and various time constants)" and "time data relating to the auxiliary functions including the M, S, T and B commands". Mechanical configuration-time data $t_N$, can be expressed by equation (2) as follows:

$$t_N = (t_{N1}, t_{N2}, \ldots). \quad (2)$$

The respective mechanical configuration-time data 3 of the numerically-controlled machine tools for which an operator estimates the machining time may be acquired in advance by an experiment or the like on the machine tools so that the acquired mechanical configuration-time data 3 can be stored in advance in the mechanical configuration-time data storage unit 110.

The mechanical configuration difference time calculation unit 90 calculates the differences between the machining times for the numerically-controlled machine tool as a standard and the other numerically-controlled machine tools, using a reference machining time $T_0$, which is the time of machining by the standard numerically-controlled machine tool estimated by a prior art technique, the NC command data n counted by the NC command data counting unit 80, and the mechanical configuration-time data $t_A$, $t_B$ and $t_C$. A machining time $T_A$ estimatable in the numerically-controlled machine tool A can be calculated by the following equation (3). In equation (3), $t_0$ is the mechanical configuration-time data of the standard numerically-controlled machine tool, the inner product of n and $t_0$ represents the configuration-dependent machining time for the standard numerically-controlled machine tool, and the inner product of n and $t_A$ represents the configuration-dependent machining time for the machine tool A.

$$T_A = T_0 + (t_A - t_0) \cdot n = T_0 + \{(t_{A1} \ t_{A2} \ \ldots) - (t_{01} \ t_{02} \ \ldots)\} \cdot \begin{pmatrix} n_1 \\ n_2 \\ \vdots \end{pmatrix} \quad (3)$$

Any of the numerically-controlled machine tools may be assumed to be the standard numerically-controlled machine tool. In estimating the machining times for the numerically-controlled machine tools A, B and C, for example, the machining time $T_0$ (=$T_A$) for the numerically-controlled machine tool A may be estimated by the prior art technique on the assumption that the numerically-controlled machine tool A is the reference numerically-controlled machine tool so that the machining times for the numerically-controlled machine tools B and C can be calculated by equation (3) based on the reference mechanical configuration-time data $t_0$ ($=t_A$). Moreover, the numerically-controlled machine tools B and C may be assumed to be standard numerically-controlled machine tools.

Based on the configuration described above, as shown in FIG. 4, the mechanical configuration-time data of a plurality of numerically-controlled machine tools of different mechanical configurations are acquired in advance. By doing this, the machining times for the other numerically-controlled machine tools can also be collectively calculated by only estimating the machining time for one of the numerically-controlled machine tools, and moreover, the machining times for these numerically-controlled machine tools can be compared collectively.

While an embodiment of the present invention has been described herein, the invention is not limited to the above-described embodiment and may be suitably modified and embodied in various forms.

The invention claimed is:

1. A machining time estimating apparatus configured to collectively calculate machining times required for machining performed in a plurality of numerically-controlled machine tools in accordance with respective NC machining programs, the machining time estimating apparatus comprising:

a mechanical configuration-time data storage unit configured to store mechanical configuration-time data, which are control parameters relating to respective machining times of the plurality of numerically-controlled machine tools;

a machining time estimation unit configured to estimate the machining time required for the machining performed in accordance with the respective NC machining program in a first numerically-controlled machine tool among the plurality of numerically-controlled machine tools, and based on NC commands of the respective NC machining program and the mechanical configuration-time data of the first numerically-controlled machine tool stored in the mechanical configuration-time data storage unit, wherein the first numerically-controlled machine tool is designated as a standard numerically-controlled machine tool used as a reference to calculate machining time for the other numerically-controlled machine tools among the plurality of numerically-controlled machine tools;

an NC command data counting unit configured to obtain NC command data based on the NC commands decoded from the respective NC machining program which affect machining time in relation to a mechanical configuration; and a mechanical configuration difference time calculation unit configured to calculate machining time required for machining performed in accordance with the respective NC machining program in each of the other numerically-controlled machine tools based on the machining time required for the machining performed in accordance with the respective NC commands in the first numerically-controlled machine tool as estimated by the machining time estimation unit and an inner product of (i) a first vector representing the NC command data obtained by the NC command data counting unit, and (ii) a second vector representing a difference in the mechanical configuration-time data between the first numerically-controlled machine tool and said each of the other numerically-controlled machine tools.

2. The machining time estimating apparatus according to claim 1, wherein the mechanical configuration-time data include parameters relating to the machining time set in each of the plurality of numerically-controlled machine tools, and time data relating to auxiliary functions of each of the plurality of numerically-controlled machine tools.

3. The machining time estimating apparatus according to claim 1, wherein the mechanical configuration-time data are acquired in advance by an experiment on the plurality of numerically-controlled machine tools.

* * * * *